United States Patent
Hreha et al.

(10) Patent No.: US 11,440,851 B1
(45) Date of Patent: Sep. 13, 2022

(54) METHOD OF MAKING CARBON MATRIX COMPOSITE FROM HIGH TEMPERATURE POLYMER MATRIX FIBER-REINFORCED COMPOSITES

(71) Applicant: Jalapeno Holdings, LLC, Bellbrook, OH (US)

(72) Inventors: Richard D. Hreha, Dayton, OH (US); Kristopher K. Aber, Dayton, OH (US); Joel P. Brubaker, Dayton, OH (US); Kristin M. Cable, Dayton, OH (US); Michael D. Rauscher, Beavercreek, OH (US)

(73) Assignee: Systima Technologies, Inc., Mukilteo, WA (US)

( * ) Notice: Subject to any disclaimer, the term of this patent is extended or adjusted under 35 U.S.C. 154(b) by 855 days.

(21) Appl. No.: 16/275,630

(22) Filed: Feb. 14, 2019

Related U.S. Application Data (60) Provisional application No. 62/630,509, filed on Feb. 14, 2018.

(51) Int. Cl.
  *C04B 35/83* (2006.01)
  *C04B 35/64* (2006.01)
  (Continued)

(52) U.S. Cl.
  CPC .............. *C04B 35/83* (2013.01); *C04B 35/64* (2013.01); *C08J 5/042* (2013.01);
  (Continued)

(58) Field of Classification Search
  CPC ........... C08J 5/042; C04B 35/64; C04B 35/83
  See application file for complete search history.

(56) References Cited

U.S. PATENT DOCUMENTS

| 3,945,999 A | 3/1976 | Gruffaz et al. |
| 10,370,508 B1 * | 8/2019 | Hreha ......................... C08J 5/04 |

(Continued)

FOREIGN PATENT DOCUMENTS

| CN | 104193706 B | 4/2014 |
| JP | 06271558 A | 9/1994 |

OTHER PUBLICATIONS

Gardiner, Ginger. "New Low-Cost, High-Temp Resins." CompositesWorld, CompositesWorld, Oct. 22, 2015, https://www.compositesworld.com/articles/new-low-cost-high-temp-resins. (Year: 2015).*

(Continued)

*Primary Examiner* — Kelly M Gambetta
*Assistant Examiner* — Andrés E. Behrens, Jr.
(74) *Attorney, Agent, or Firm* — Dinsmore & Shohl LLP

(57) ABSTRACT

Methods of producing a carbon matrix composite are provided which include preparing a carbon matrix composite precursor comprising at least one carbon-based reinforcement material and a cured thermoset polymer matrix comprising a chemical composition in accordance with Formula I

FORMULA I (Continued)

-continued

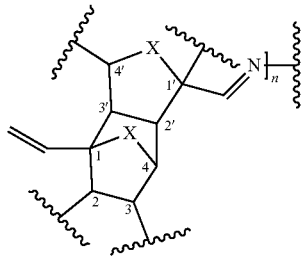

where n and m are integers, at least one of $R^1$ or $R^2$ comprises an aromatic moiety, and X is selected from the group consisting of $CH_2$, NH, O, S, $SO_2$, and combinations thereof. The methods further include heating the carbon matrix composite precursor in air to a first processing temperature of between 300° C. and 500° C. to form a carbon matrix composite intermediate, and heating the carbon matrix composite intermediate in nitrogen to a second processing temperature of between 900° C. to 1650° C. and holding at the second processing temperature for at least 1 hour in an inert gas environment to form the carbon matrix composite.

20 Claims, 3 Drawing Sheets

(51) Int. Cl.
    *C08J 5/04*     (2006.01)
    *C08G 73/02*     (2006.01)
    *C08G 73/06*     (2006.01)
    *C08G 73/00*     (2006.01)

(52) U.S. Cl.
    CPC .............. *C04B 2235/422* (2013.01); *C04B 2235/5248* (2013.01); *C04B 2235/658* (2013.01); *C04B 2235/6562* (2013.01); *C04B 2235/6565* (2013.01); *C04B 2235/6567* (2013.01)

(56) References Cited

U.S. PATENT DOCUMENTS

2014/0242519 A1* 8/2014 Sagehashi ............... C07C 69/54
                                                      430/285.1
2015/0376153 A1 12/2015 Masuno et al.

OTHER PUBLICATIONS

C/C Manufacturing with MG Resin and 3D Preform (https://techport.nasa.gov/view/94522, 2018) (Year: 2018).* https://www.compositesworld.com/cdn/cms/MG%20Resin.pdf (Year: 2018).*

Ahmed et al., "Thermal insulation by heat resistant polymers for solid rocket motor insulation", Journal of Composite Materials 46(13) pp. 1549-1559, 2011.

De Almedia et al., "Processing and characterization of ablative composites used in rock motors", Journal of Reinforced Plastics & Composites, vol. 33(16) pp. 1474-1484, 2014.

Natali et al., "Ablative properties of carbon black and MWNT/phenolic composites: A comparative study", Composites: Part A 43, pp. 174-182, 2012.

Ogasawara et al., "Thermal Response and Ablation Characteristics of Carbon Fiber Reinforced Composite with Novel Silicon Containing Polymer MSP", Journal of Composite Materials, vol. 36, No. 2, pp. 143-157, 2002.

Parkar et al., "Ablation characteristics of an aromatic thermosetting copolyester/carbon fiber composite", Journal of Composite Materials, 46(15), pp. 1819-1830, 2011.

Sabagh et al., "Thermochemical erosion and thermophysical properties of phenolic resin/carbon fiber/graphite nanocomposites", Journal of Reinforced Plastics & Composites, vol. 35(24), pp. 1814-1825, 2016.

Sandor, "PBI (Polybenzimidazole): Synthesis, Properties and Applications", High Performance Polymers, vol. 2, No. 1, pp. 25-37, 1990.

Williams et al., "Thermal Protection Materials: Thermophysical Property Data", NASA Reference Publication 1289, 1992.

Zhang et al., "Addition-curable phthalonitrile-functionalized novolac resin", High Performance Polymers, 24(5), pp. 398-404, 2012.

Brunovska et al., "Thermal Properties of Phthalonitrile Functional Polybenzoxazines", Thermochemica Acta Aug. 2000: 195-203.

NASA, "Game Changing Development Program, Potential Industry/NASA Partnership in the Development and Assessment of High Performance Thermal Protection System Materials", NNH15ZOA005L. Mar. 2, 2015. NSPIRES. Jul. 3, 2015.

Ransone et al., "Recent Advances in Carbon-Carbon Substrate Technology at Nasa Langley Research Center", https://ntrs.nasa.gov/search.jsp?R=19930003267, Feb. 4, 2019.

Ali, "Palladium(II) and zinc(II) compleses of neutral [M2O2] donor Schiff bases derived from furfuraldehyde: Snythesis, characterization, fluorenscence and corrosion inhibitors of ligands", Spectrochimica Acta Part A: Molecular and Biomolecular Spectroscopy 132, pp. 52-60, 2014.

Abouel-Enein, "Polymeric and Sandwich Schiff's bases compleses derived from 4, 4'-Methylenedianiline", Journal of Thermal Analysis and Calorimetry, vol. 91, No. 3, pp. 929-936, 2008.

Wen et al., "Synthesis and acidochromic, electrochromic properties of Schiff bases containing furan and triphenylamine units", Synthetic Metals 202, pp. 89-97, 2015.

Zhizhko et al., "Oxo/Imido Heromethathesis Reactions Catalyzed by a Silica-Supported Tantalum Imido Complex", Organometallics 32, pp. 3611-3617, 2013.

* cited by examiner

```
┌─────────────────────────────────────────────────┐
│   Preparing a carbon matrix composite precursor │
└─────────────────────────────────────────────────┘
                       │
                       ▼
┌─────────────────────────────────────────────────┐
│ Heating the carbon matrix composite precursor to a first │
│ processing temperature between 300°C and 500°C to │
│ form a carbon matrix composite intermediate      │
└─────────────────────────────────────────────────┘
                       │
                       ▼
┌─────────────────────────────────────────────────┐
│ Heating the carbon matrix composite intermediate to a │
│ second processing temperature between 900°C and  │
│ 1650°C and holding for at least 1 hour to form a carbon │
│ matrix composite.                                │
└─────────────────────────────────────────────────┘
```

FIG. 5

METHOD OF MAKING CARBON MATRIX COMPOSITE FROM HIGH TEMPERATURE POLYMER MATRIX FIBER-REINFORCED COMPOSITES

CROSS-REFERENCE TO RELATED APPLICATIONS

This application claims priority to U.S. Provisional Application 62/630,509, filed Feb. 14, 2018, which is incorporated by reference herein in its entirety.

STATEMENT REGARDING FEDERALLY SPONSORED RESEARCH OR DEVELOPMENT

This invention was made with U.S. Government support under Contract No. W31P4Q-17-C-0145 awarded by the US ARMY Aviation and Missile Command to Cornerstone Research Group Inc. The U.S. Government has certain rights in the invention.

TECHNICAL FIELD

Embodiments of the present disclosure generally relate to methods of producing a carbon matrix composite.

BACKGROUND

In industrial, military, and space applications there arise needs for materials which achieve high-temperature resistance while maintaining structural performance. Such desirable performance characteristic especially arise in thermal protection applications that need to manage high thermal fluxes and integrated thermal load environment. Previous attempts have been made to develop unique material designs as necessary to meet the challenges of high-temperature resistance in combination with retention of structural performance. Current go-to materials for thermal protection structures include carbon fiber reinforced carbon matrix composites, alternatively known as a carbon matrix composite, or carbon-silicon carbide (C—SiC) for temperatures greater than 2500° F. However, the production of carbon matrix composites currently require lengthy processing time, and multiple resin impregnation and/or gaseous infusion processing cycles to reduce void content and achieve desirable structural performance. The extended processing time leads to high costs associated with such thermal protection systems.

SUMMARY

As such, there is an ongoing need for new processes and new precursor materials with shorter processing times and less processing steps to prepared materials which achieve high temperature structural performance. The present embodiments address these needs by providing carbon matrix composites produced with selected high temperature chemical compositions in accordance with improved processing techniques.

Embodiments of the present disclosure relate to methods of producing a carbon matrix composite. The methods include preparing a carbon matrix composite precursor, the carbon matrix composite precursor comprising at least one carbon-based reinforcement material and a cured thermoset polymer matrix comprising a chemical composition in accordance with Formula

FORMULA I wherein m and n are each an integer greater than or equal to 1, at least one of $R^1$ or $R^2$ comprises an aromatic moiety, and X is selected from the group consisting of $CH_2$, NH, O, S, $SO_2$, and combinations thereof. The carbon matrix precursor represents an initial carbon-based reinforcement material and cured thermoset polymer matrix which may be converted to the carbon matrix composite through heating. The method further includes heating the carbon matrix composite precursor to a first processing temperature, wherein the first processing temperature is between 300° C. and 500° C. to form a carbon matrix composite intermediate and the heating to the first processing temperature is completed in an atmosphere comprising air. The carbon matrix composite intermediate represents an intermediary between the carbon matrix composite and the fully formed carbon matrix composite. Further, the method includes heating the carbon matrix composite intermediate to a second processing temperature and holding at the second processing temperature for at least 1 hour to form the carbon matrix composite, wherein the second processing temperature is between 900° C. to 1650° C. and the heating to the second processing temperature and hold at the second processing temperature is completed in an inert gas environment. The heating steps result in carbonization of the cured thermoset polymer matrix.

BRIEF DESCRIPTION OF THE DRAWINGS

The following detailed description of specific embodiments of the present disclosure can be best understood when read in conjunction with the following drawings, in which.

DETAILED DESCRIPTION

Embodiments of the present disclosure generally relate to carbon matrix composites and methods of producing the carbon matrix composites.

In accordance with embodiments of the method of producing a carbon matrix composite, the method comprises preparing a carbon matrix composite precursor, heating the carbon matrix composite precursor to a first processing temperature to generate a carbon matrix composite intermediate, heating the carbon matrix composite intermediate to a second processing temperature, and holding the carbon matrix composite intermediate at the second processing temperature for at least 1 hour to generate the carbon matrix composite.

In accordance with embodiments of the present disclosure, the carbon matrix composite precursor comprises at least one carbon-based reinforcement material and a cured thermoset polymer matrix comprising a chemical composition in accordance with Formula I.

Figure 4:
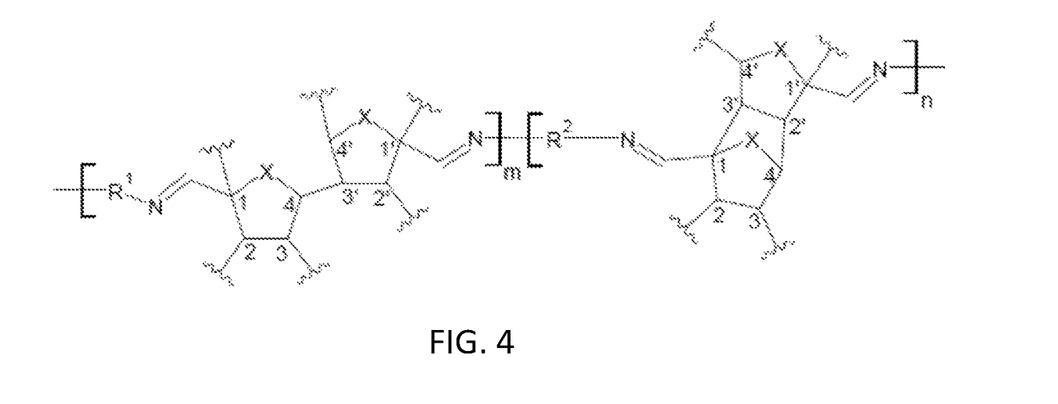
FIG. 4 is the chemical structure of Formula I according to the present disclosure.
Figure 5:
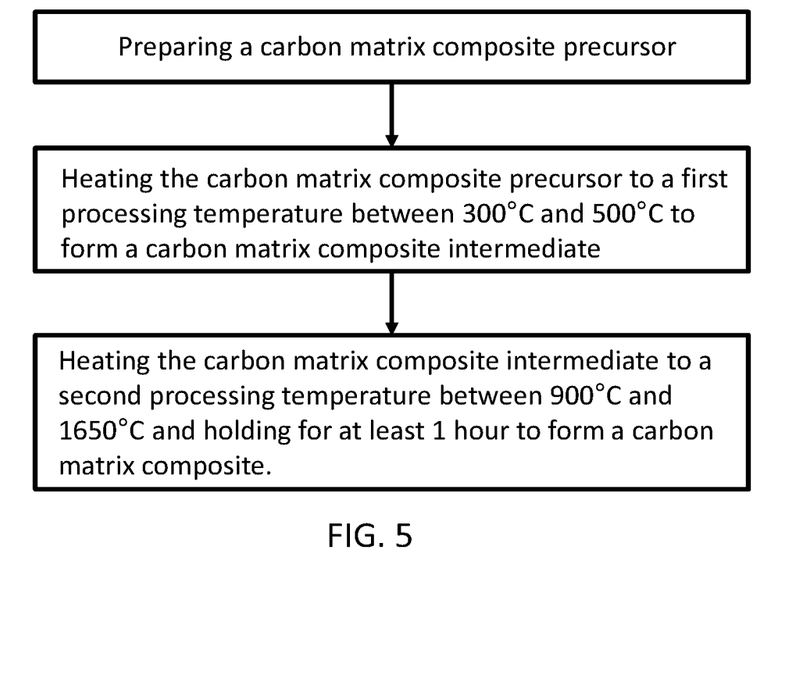
FIG. 5 is a flow chart of a heating process according to the present disclosure.

The chemical composition of Formula I has the chemical formula as illustrated in FIG. 4 and reproduced below:

FORMULA I where n and m are each an integer greater than or equal to 1, at least one of $R^1$ or $R^2$ includes an aromatic moiety, and X is one or more of $CH_2$, NH, O, S, $SO_2$, and combinations thereof. It should be understood that a "group" is used to refer to a moiety containing at least one atom. For instance, an "oxygen group" is used to refer to any moiety containing oxygen, such as a single oxygen atom or a moiety containing one or many oxygen atoms. In any of the formulas depicted throughout this disclosure, an unconnected bond, or a bond between a bracket "—[—X" refers to an open covalent bond, which may be a single, double, or even a triple bond between that constituent and another molecule. Similarly, in any of the formulas depicted throughout this disclosure, a wavy bond, "∿∿∿" represents a potentially cross-linkable site in which the composition may or may not crosslink if placed under appropriate cross-linking conditions.

Heating the carbon matrix composite precursor to the first processing temperature and subsequently to the second processing temperature carbonizes the cured thermoset polymer matrix to create the carbon matrix composite. Specifically, a composite of the carbonized cured thermoset polymer matrix in the carbon-based reinforcement material is formed.

In one or more embodiments, heating the carbon matrix composite precursor to a first processing temperature to form the carbon matrix composite intermediate is completed in an atmosphere comprising air. Specifically, the carbon matrix composite precursor may be placed in an oven or autoclave with atmospheric air disposed therein during heating to the first processing temperature. The air atmosphere results in further crosslinking of the cured thermoset polymer matrix component of the carbon matrix composite precursor. The additional crosslinking imposed by such heating step in air allows the polymer to retain more mass during the subsequent pyrolysis step to form the carbonized cured thermoset polymer matrix of the carbon matrix composite.

In one or more embodiments, the first processing temperature is between 300° C. and 500° C. In various further embodiments, the first processing temperature is between 325° C. and 475° C., 325° C. and 450° C., or 350° C. and 425° C.

In one or more embodiments, the carbon matrix composite precursor is heated to the first processing temperature at a rate of 0.5° C. to 10° C. per minute. In further embodiments, the carbon matrix composite precursor is heated to the first processing temperature at a rate of 0.5° C. to 2° C. per minute.

In one or more embodiments, heating the carbon matrix composite intermediate to the second processing temperature to form the carbon matrix composite is completed in an inert gas environment. An inert gas environment is an atmosphere formed from substantially only one or more inert gases. In various embodiments the inert gas provided in the inert gas environment may be nitrogen or argon. In one or more embodiments, the inert gas environment comprises a nitrogen atmosphere of at least 99% purity by volume. Specifically, the air atmosphere in the oven or autoclave may be evacuated and replaced with the inert gas environment, such as a nitrogen gas atmosphere, for heating to the second processing temperature. The inert gas environment results in carbonization of the thermoset polymer matrix component of the carbon matrix composite precursor, but protects the resulting carbonized material from oxidation and further decomposition to carbon dioxide. During the second heating step the organic thermoset polymer matrix undergoes pyrolysis and results in a carbonized thermoset polymer matrix.

In one or more embodiments, the second processing temperature is between 900° C. and 1650° C. In various further embodiments, the second processing temperature is between 900° C. and 1400° C., 900° C. and 1250° C., or 900° C. and 1100° C.

In one or more embodiments, the carbon matrix composite intermediate is heated to the second processing temperature at a rate of 0.5° C. to 10° C. per minute. In further embodiments, the carbon matrix composite precursor is heated to the second processing temperature at a rate of 0.5° C. to 2° C. per minute.

In one or more embodiments, the carbon matrix composite intermediate is heated to the second processing temperature and held at the second processing temperature for at least 1 hour. In various further embodiments, the hold time at the second processing temperature is at least 90 minutes, at least 2 hours, at least 3 hours, or at least 4 hours.

In one or more embodiments, the carbon matrix composite intermediate is cooled in a cooling step before transition from the air atmosphere to the nitrogen atmosphere. In various embodiments, the carbon matrix composite intermediate is cooled from the first processing temperature to less than 200° C., less than 100° C., less than 50° C., or to approximately room temperature. It will be appreciated that in some embodiments, the cooling step is optional and the air may be purged and replaced with an inert gas at the first processing temperature. It will be understood that room temperature is approximately 20° C. to 25° C. (68° F. to 77° F.). Further, in various embodiments, the cooling of the carbon matrix composite intermediate may be at a rate of 0.5° C. to 20° C. per minute, 0.5° C. to 10° C. per minute, or 0.5° C. to 2° C. per minute.

In Formula I, n and m may be independently selected and may be any suitable integer greater than or equal to 1. In some embodiments, n, m, or both may be from 1 to 500, such as from 1 to 300, from 1 to 200, or from 1 to 100. For instance, n, m, or both may be from 20 and 200, such as from 50 and 150, from 20 and 100, or from 20 to 150.

As mentioned, at least one of $R^1$ or $R^2$ includes an aromatic moiety. Without being bound by any particular theory, aromaticity in the oligomer backbone of the chemical composition may provide improved thermal stability and flame resistance, by restricting movement and preventing rotation of the polymer backbone to increase glass transition temperature as the composition is heated, and increase the char formation when exposed to fire or elevated temperature. Any suitable aromatic moiety may be chosen for $R^1$, $R^2$, or both, which may vary based on the desired application of use. In some embodiments, $R^1$ or $R^2$, or both, may contain at least one of a phenyl group, a naphthyl group, a benzyl group, a 4-cyanophenyl group or combinations of any these. $R^1$, $R^2$, or both may additionally contain an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a methyl group, a propyl group, a dimethylamino group, a boronic acid group, or combinations thereof. In some particular embodiments, $R^1$ or $R^2$, or both, may include, (1-(5-(1-(5-Formyl-2-furfyl)-1-methylethyl)-2-furfyl)-1-methylethyl), diphenylsulfone, diphenylsulfone, diphenyl ether, 1,3-bis(phenoxy)-benzene, moieties, or derivatives obtained from 4,4'-(1,3-phenylenedioxy)dianiline, 1,3-bis(3-aminophenoxy)benzene, 4,4'-oxydianiline, 4-aminophenyl sulfone, 3-aminophenyl sulfone, isophthalaldehyde, or combinations of any of these.

As mentioned, X may be one or more of $CH_2$, NH, O, S, $SO_2$. In some particular embodiments, X may be 0, NH, $CH_2$ or S. In some embodiments, X may be 0.

The cured thermoset polymer matrix comprising a chemical composition in accordance with Formula I also provides thermal and mechanical stability to the ultimate carbon matrix composite.

In some embodiments, as stated, the cured thermoset polymer matrix may have improved thermal oxidative stability. Such improved thermal oxidative stability allows further heat treatment at higher temperature without excessive oxidation and/or degradation of the material before formation of the final carbonized material forming the carbonized thermoset polymer matrix. In one embodiment, the exposure of the cured thermoset polymer to air at elevated temperature results in a structure with increased thermal stability as compared with heating in nitrogen gas. This surprising observation results in the ability to achieve greatly enhanced char yields relative to resins used to produce carbon matrix composites. It is additionally surprising that the observation is not transient, meaning after exposure the effect is permanent. For example, char yields of greater than 72% are realized in MG 3000-based thermoset which has undergone exposure to air at elevated temperature compared to 58% for MG 3000-based thermoset in a completely inert environment. MG 3000 is a thermoset resin in accordance with embodiments of Formula I made by Cornerstone Research Group, Inc. (Dayton, Ohio). Resins in the industry considered to be high carbon yield resins are typically phenolics or furan resins and exhibit carbon yields of 50-55% and 50-60% respectively. Traditional attempts at formation of carbon matrix composites have relied on a phenolic for the initial formation of a carbon body which can later be densified with a furan resin. The use of polymers with increased char yields over the current state of the art in phenolics or furan resins is beneficial with generation of the same level of carbon in the carbon matrix composite with fewer densification cycles.

In some embodiments, the heat and air treated thermoset polymer matrix after elevation to the first processing temperature may have a glass transition temperature ($T_g$) of greater than or equal to 400° C. The heat and air treated thermoset polymer matrix may have a glass transition temperature of greater than or equal to 420° C., such as greater than or equal to 450° C., greater than or equal to 475° C., greater than or equal to 500° C., or greater than or equal to 550° C. In some embodiments, the post-cured thermoset polymer matrix may have a glass transition temperature of greater than or equal to 575° C., such as greater than or equal to 600° C., greater than or equal to 625° C., greater than or equal to 650° C., or greater than or equal to 700° C. Without being bound by any particular theory, the numerous crosslinking sites indicated in the chemical structure of Formula I may contribute to the increase $T_g$, increase in thermal stability, and improved flame resistance. The presence of a highly crosslinked structure restrict the movement of the polymer backbone. It may also increase the number of strong carbon-carbon bonds that need to be broken before any thermal degradation of the carbon matrix. In addition, the aromatic $R^1$ or $R^2$ group may contribute to the increased $T_g$, as the aromatic moiety may restrict rotational freedom of the polymer backbone in the chemical composition.

The cured thermoset polymer matrix may also have an improved char yield, referring to the percentage of solid material obtained at the end of pyrolysis. The higher the char yield, the more carbon/inorganic materials are left behind. As more carbon is left behind, it will lead to a decrease in total heat release. The char yield of a material can be measured by a micro combustion calorimeter (MCC) at 1 C/s heating rate under nitrogen from 150 to 950 C using method A of ASTM D7309 (pyrolysis under nitrogen). In some embodiments, the cured thermoset polymer matrix may have a char yield of greater than or equal to 50 mass %. The cured thermoset polymer matrix may have a char yield of greater than or equal to 60 mass %, or greater than or equal to 70 mass %. In comparison, a standard polystyrene sample may have a char yield of 0% under the same test conditions.

In some embodiments, the cured thermoset polymer matrix may not only have improved thermal properties, but may also have advantageous mechanical properties as well. In some embodiments, the cured thermoset polymer matrix may have a storage modulus of greater than or equal to 1 GPa, as measured according to the American Society for Testing and Materials (ASTM) Standard D4065. For instance, the cured thermoset polymer matrix may have a storage modulus of from 1 to 4 GPa, such as from 1 to 2 GPa. In other embodiments, the cured thermoset polymer matrix may have a storage modulus of greater than or equal to 9 GPa, as measured according to the American Society for Testing and Materials (ASTM) Standard D4065. For instance, the cured thermoset polymer matrix may have a storage modulus of from 9 to 12 GPa, such as from 10 to 11 GPa.

The at least one carbon-based reinforcement material may be chosen based on the desired application of use. In some embodiments, the carbon-based reinforcement material may be any of carbon fiber, random carbon mats, carbon fiber scrims, chopped carbon fibers, carbon fiber knits, unidirectional carbon fiber plies, three-dimensional carbon fiber weaves, three-dimensional carbon fiber preforms, prepreg carbon fiber, plain weave fabric, twill fabrics, or combinations thereof.

The carbon-based reinforcement material may be a unidirectional fibrous or a woven fabric material, and in some embodiments, may be arranged in a 0° and 90° or 0°, 45°, and 90° orientation between layers to provide structural support or may be in any other layup or laminate arrangements known in the industry. The carbon-based reinforcement material may be in a braided, woven, plain weave, twill weave, satin weave, in a symmetric or non-symmetric laminate stack, in any other known configuration, or in any combination of configurations. Depending on the industrial application and the part thickness desired, it may be desirable to use multiple layers of the carbon-based reinforcement material to form a layup. In some embodiments, the layup may comprise up to 300 layers of material, however, the present process is suitable for greater than 300 layers as well. In specific embodiments, the layup may include from 1 to 100 layers, or from 4 to 30 layers of carbon-based reinforcement material.

The carbon matrix composite precursor may comprise the cured thermoset polymer matrix comprising the chemical composition in accordance with Formula I and the carbon-based reinforcement material in various ratios. In one or more embodiments, the carbon matrix composite precursor comprises 32 to 42 percent by weight of the carbon-based reinforcement material and 58 to 68 percent by weight of the cured thermoset polymer matrix. In further embodiments, the carbon matrix composite precursor comprises 35 to 40 percent by weight of the carbon-based reinforcement material and 60 to 65 percent by weight of the cured thermoset polymer matrix or the carbon matrix composite precursor comprises 37 to 38 percent by weight of the carbon-based reinforcement material and 62 to 63 percent by weight of the cured thermoset polymer matrix.

Figure 1:
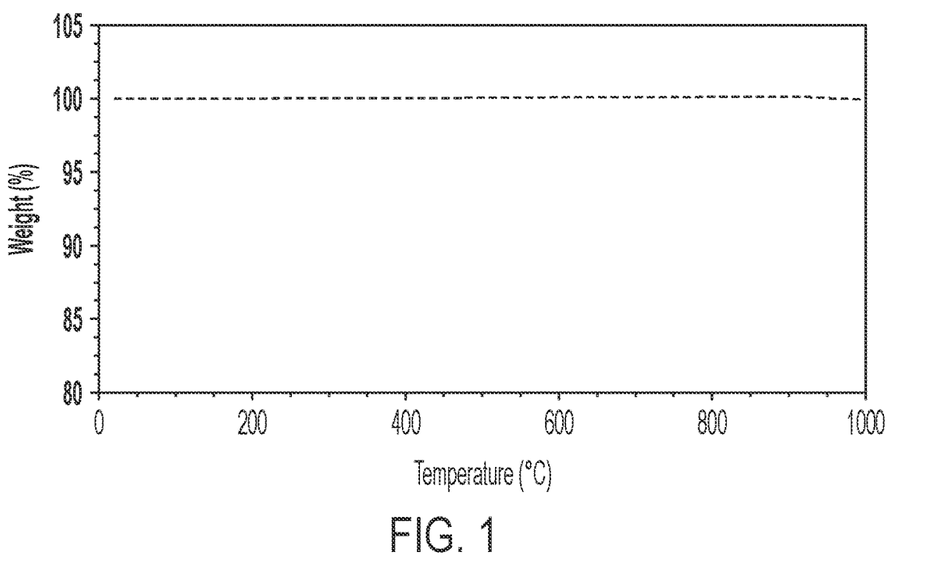
FIG. 1 is a graph of a thermal gravimetric analysis (TGA) thermogram of a carbonized thermoset polymer matrix according to one or more embodiments of the present disclosure.

In various embodiments, the carbonized thermoset polymer matrix may have a mass loss of less than or equal to 10 wt. %, or less than 1 wt. %, in nitrogen at temperatures of greater than or equal to 900° C., or equal to 1000° C., when measured using thermal gravimetric analysis (TGA). With reference to FIG. 1, a TGA thermogram of a carbonized thermoset polymer matrix comprising MG 3000-based thermoset is provided and demonstrates mass loss of less than 1 wt. %. Specifically, after carbonization of the thermoset polymer matrix, the carbonized thermoset polymer matrix may be reheated without substantial additional mass loss.

The carbon matrix composite formed from the first heating step and the second heating step may be further processed to densify the carbon matrix composite. In one embodiment, the carbon matrix composite may be infiltrated with a polymer resin followed by curing and subsequent carbonization to achieve densification of the carbon matrix composite. In various embodiments, the polymer resin may comprise the chemical composition in accordance with Formula I, a phenolic resin based polymer, a furan resin based polymer, or combinations thereof. Description of an example curing procedure is provided infra in the disclosure with regards to Example 1. The carbon matrix composite with the cured secondary infusion of polymer resin may undergo the conversion and carbonization process in accordance with methods of the present disclosure to obtain a denser carbon matrix composite. Specifically, the carbon matrix composite with the cured polymer resin may be heated to the first processing temperature and subsequently to the second processing temperature to carbonize the cured polymer resin from the secondary infusion. It will be appreciated that the densification procedure of secondary infusion and conversion may be repeated multiple times to progressively generate a denser carbon matrix composite.

It will be appreciated that the short beam strength (SBS) of the carbon matrix composite measured according to ASTM D2344 generally increases with densification steps. In various embodiments, the carbon matrix composite after initial formation and no densification steps comprises a SBS of greater than 0.5 ksi, greater than 0.7 ksi, or greater than 0.9 ksi. Specifically, the previous SBS measurements are provided for the carbon matrix composite after a single iteration of heating to the second processing temperature and holding at the second processing temperature and before any follow-on densification steps.

The carbon matrix composite may be used, or may be formulated or further processed for use, in many industries. The carbon matrix composite may be suitable for use in numerous industries, including, for instance, architecture, construction, oil and gas, mining, defense, space, and aerospace industries. In some embodiments, the carbon matrix composite may be a fiber reinforced composite, or it may be a particulate-reinforced composite. For example, the composite may be used as a fiber-reinforced polymer composite or particulate-reinforced polymer composite panels, parts, or structures in the architecture, construction, oil and gas, mining, space, aerospace, defense, automotive, marine, or manufacturing industries. In other embodiments, the carbon matrix composite may be used as heat shield for re-entry vehicles, fireproof wall panels, fire bricks, composite casing for oil and gas wells, aircraft and ship interior panels, automobile body parts, fire resistant panels for armored vehicles.

EXAMPLES

In order that the previously described embodiments may be more easily understood, reference is made to the following examples that illustrate one or more features of the present disclosure. The examples are in no ways limiting in scope.

The following examples illustrate one or more of the embodiments described in the disclosure.

Example 1

A test panel of continuous fiber reinforced polymer composite material was fabricated using a hand layup process as Example 1. A polymer resin and a carbon-based reinforcement material were provided to form the continuous fiber reinforced polymer composite material. The polymer resin was MG 3000 Resin, a thermoset resin in accordance with embodiments of Formula I made by Cornerstone Research Group, Inc. (Dayton, Ohio). The carbon-based reinforcement material was 4 plies carbon fiber (T650 de-sized plain weave) from BFG Industries (Greensboro, N.C.). The polymer resin was infiltrated into the carbon-based reinforcement using a hand pre-impregnation process whereby the polymer resin was applied to release film using a 6 mil doctor blade. The coated film was allowed to dry and subsequently placed coated surface down onto the carbon-based reinforcement using a consumer grade iron to transfer the coated film from the release film onto the carbon-based reinforcement. The plies of carbon-based reinforcement were then laid up in an aluminum mold using a 0/90 layup schedule, covered, and sealed with a vacuum bag film. The test panel was prepared with a composition of 37.2% of polymer resin to 62.8% of carbon fiber by weight. Vacuum pressure (28 in. Hg) was applied and the vacuum bagged sample was heated in an autoclave at 100 psi while being heated to 220° C. at a heating rate of 1.1° C. per minute. The sample was further held at 220° C. for an additional 4 hours before cooling to room temperature to produce the test panel.

Example 2

A test panel of carbon matrix composite was prepared as Example 2. To prepare Example 2 the test panel of Example 1 was provided as a carbon matrix composite precursor. The test panel was heated at a rate of 2° C. per minute to 445° C. in air followed by cooling the resulting material at a rate of 2° C. per minute to room temperature in air. After changing the atmosphere to nitrogen gas, a second heating cycle of 2° C. per minute was then used to heat the material to 1000° C., followed by a 2 hours dwell at 1000° C. before cooling the sample at a rate of 2° C. per minute to room temperature. The process resulted in a carbon matrix composite according to one or more embodiments of the present disclosure.

Comparative Example 3

Advanced Carbon-Carbon (ACC) was developed by LTV Corporation as part of NASA Langley sponsored development as a material for use on the wing-leading-edges and nose-cap of the Space Shuttle. ACC largely remains the baseline to which new experimental material are compared. Suffixes may be provided to the ACC name to indicate the number of densification steps after initial carbonization. For example, ACC-4 is indicative of ACC which has undergone 4 densification steps after initial carbonization.

Comparative testing of Example 2 and Comparative Example 3 was completed. The carbon matrix composite of Example 2 and the ACC of Comparative Example 3 were tested to determine the short beam strength (SBS) of the sample according to ASTM D2344. Table 1 provides results of the testing of the Example 2 carbon matrix composite samples and the comparative samples (ACC).

TABLE 1

| | | Short Beam Strength Testing | | | | | |
|---|---|---|---|---|---|---|---|
| | | As Molded (prior to initial carbonization) | Number of Densification Steps | | | | |
| | | | 0 | 1 | 2 | 3 | 4 |
| SBS [ksi] | Comparative Example 1 (ACC) | 1.7 | 0.2 | 0.6 | 1.0 | 1.1 | 1.1 |
| | Example 2 | 8.40 | 0.92 | — | — | — | — |

The results of Table 1 demonstrate that the SBS of Example 2 sample with no subsequent densification steps is comparable to ACC samples with 2 or more densification steps. Achievement of SBS in excess of 0.9 ksi without the need for densification steps demonstrates a marked improvement and advancement in carbon matrix composites. Carbon matrix composites in accordance with Example 2 and the embodiments of the present disclosure allow for quicker and thus more cost effective carbon matrix composite production with the elimination of the need for repeated densification steps to achieve comparable short beam strength due to the high carbon yield of the base polymer in the pyrolysis process.

Figure 2:
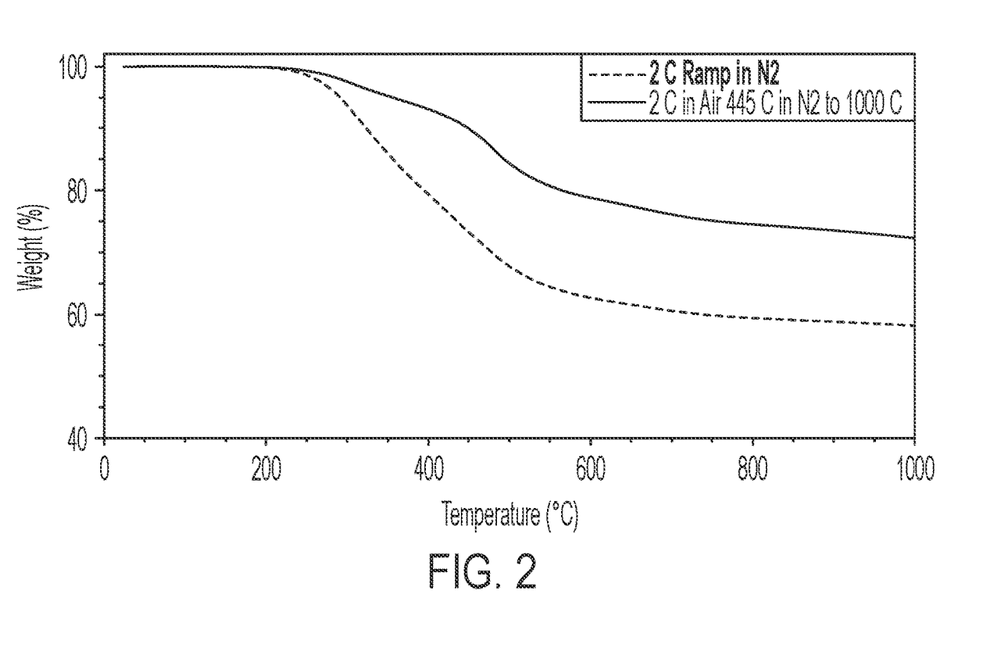
FIG. 2 is a graph of a thermal gravimetric analysis (TGA) thermogram of a cured thermoset polymer matrix according to one or more embodiments of the present disclosure.

The high char yield and the effects of heat treatment in the presence of air can be illustrated by TGA. With reference to FIG. 2, the carbon yield of cured MG 3000 is determined by heating a resin sample in a nitrogen atmosphere at 2° C. per minute. The char yield at 1000° C. is demonstrated as greater than 58% by weight. A second sample of identical cured MG 3000 was tested in accordance with a different carbonization heating processes. Specifically, initial temperature ramping to 445° C. was completed in air before changing to a nitrogen atmosphere for heating to 1000° C. demonstrated an increase in carbon yield to greater than 72% by weight. It will be appreciated that a carbon yield of greater than 72% by weight greatly exceeds the yield of the state of the art phenolic and furan resins.

Figure 3:
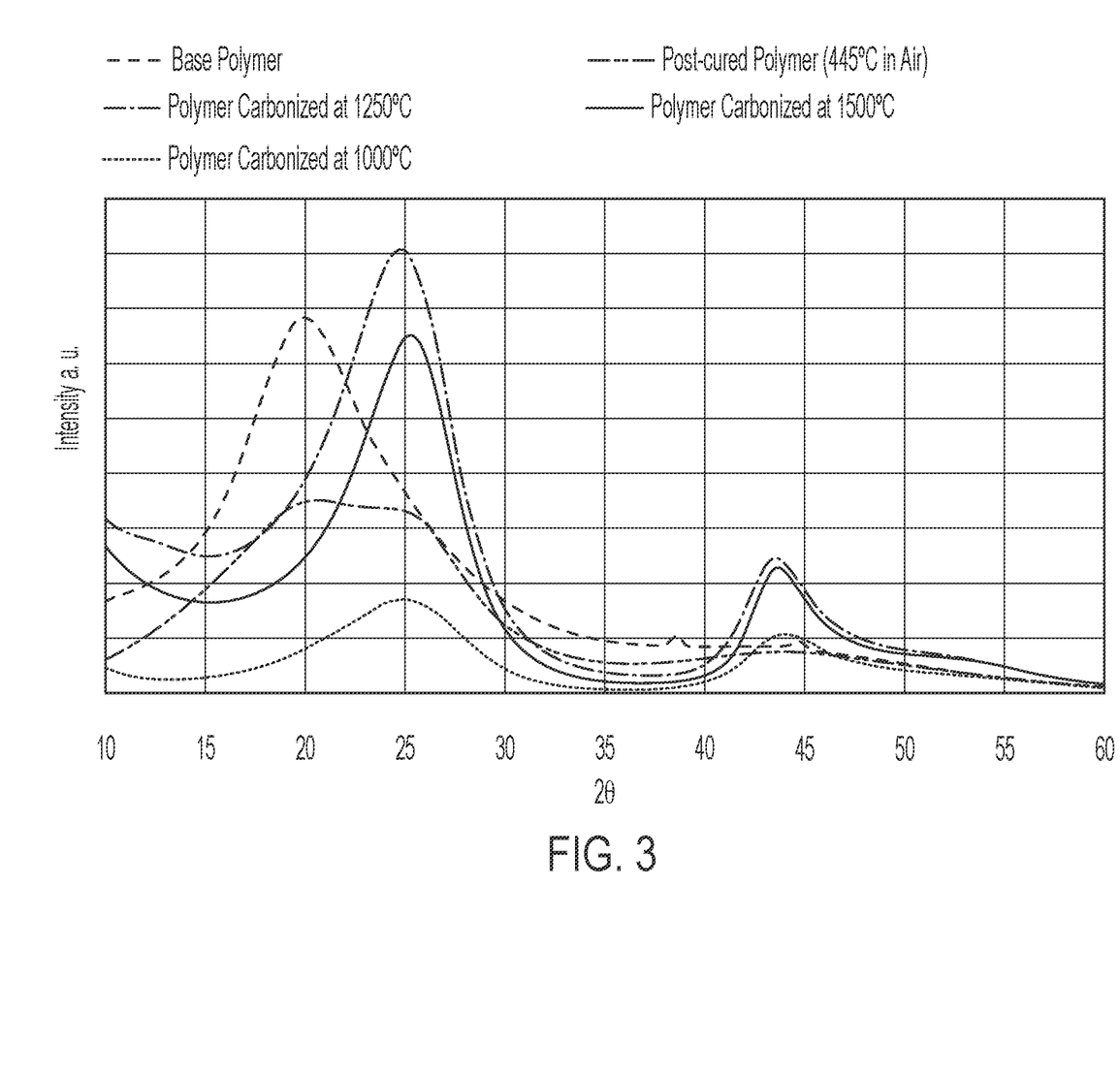
FIG. 3 is a graph of an X-Ray Diffraction (XRD) analysis of carbon matrix composites and precursors of the same according to one or more embodiments of the present disclosure.

With reference to FIG. 3, the graph shows results from a X-Ray Diffraction (XRD) study and illustrates the conversion of the carbon in the cured thermoset polymer matrix to graphite in the carbon matrix composite. Peaks at approximately 25° (Graphite 002) and approximately 44° (Graphite 101) are characteristic of graphitic carbon species. It is noted that a non-graphitic peak at 20° present in the cured thermoset polymer matrix ("Base Polymer") disappears and emerging graphitic peaks at 25° and 44° (Graphite 002 and 101) appear upon heat treatment temperatures greater than 445° C. ("Post-cured Polymer (445° C. in Air)") as with only heating to the first processing temperature. The graphitic peaks (both Graphite 002 and 101) become more pronounced upon subsequent heating and holding at the second processing temperature with graphic traces for heating to 1000° C. ("Polymer Carbonized at 1000° C."), 1250° C. ("Polymer Carbonized at 1250° C."), and 1500° C. ("Polymer Carbonized at 1500° C.") illustrated.

With further reference to FIG. 3, in general, the 2θ parameter represents the spacing between the lattice structure of carbon based material. The 2θ peak at 20° is characteristic of the carbon atoms present in the cured thermoset polymer matrix. After the heat treatment at the first processing temperature and second processing temperature in accordance with the present disclosure, the resulting carbon matrix composite shows a 2θ peak at approximately 25° that is typically exhibited by carbon species in graphitic material. The 2θ peak at approximately 25° represents the tighter spacing between the carbon atoms in the more structured graphitic sheets in the carbonized thermoset polymer matrix of the carbon matrix composite as compared to carbon atoms in the cured thermoset polymer matrix.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

What is claimed is:

1. A method of producing a carbon matrix composite, the method comprising:
    preparing a carbon matrix composite precursor, the carbon matrix composite precursor comprising at least one carbon-based reinforcement material and a cured thermoset polymer matrix comprising a chemical composition in accordance with Formula I

FORMULA I wherein:
    m and n are each an integer greater than or equal to 1,
    at least one of $R^1$ or $R^2$ comprises an aromatic moiety, and
    X is selected from the group consisting of $CH_2$, NH, O, S, $SO_2$, and combinations thereof;
heating the carbon matrix composite precursor to a first processing temperature, wherein:
    the first processing temperature is between 300° C. and 500° C. to form a carbon matrix composite intermediate, and
    the heating to the first processing temperature is completed in an atmosphere comprising air; and
heating the carbon matrix composite intermediate to a second processing temperature and holding at the second processing temperature for at least 1 hour to form the carbon matrix composite, wherein:
    the second processing temperature is between 900° C. to 1650° C., and
    the heating to the second processing temperature and hold at the second processing temperature is completed in an inert gas environment.

2. The method of claim 1, wherein the carbon-based reinforcement material comprises carbon fiber.

3. The method of claim 1, wherein carbon-based reinforcement material comprises carbon fiber, random carbon mats, carbon fiber scrims, chopped carbon fibers, carbon fiber knits, unidirectional carbon fiber plies, three-dimensional carbon fober weaves, three-dimensional carbon fiber preforms, prepreg carbon fiber, plain weave fabric, twill fabrics, or combinations thereof.

4. The method of claim 1, wherein the method further comprises cooling the carbon matrix composite intermediate to room temperature under the atmosphere comprising air before heating the carbon matrix composite intermediate to the second processing temperature in the inert gas environment.

5. The method of claim 1, wherein the first processing temperature is between 350° C. and 445° C.

6. The method of claim 1, wherein the second processing temperature is between 900° C. and 1100° C.

7. The method of claim 1, wherein the heating the carbon matrix composite precursor to the first processing temperature is completed at a rate of 0.5° C. to 2° C. per minute.

8. The method of claim 1, wherein the heating the carbon matrix composite intermediate to the second processing temperature is completed at a rate of 0.5° C. to 2° C. per minute.

9. The method of claim 4, wherein the cooling the carbon matrix composite intermediate to room temperature under the atmosphere comprising air is completed at a rate of 0.5° C. to 2° C. per minute.

10. The method of claim 1, wherein n, m, or both, are integers from 1 to 200.

11. The method of claim 1, wherein $R^1$, $R^2$, or both comprise one or more of a phenyl group, a naphthyl group, a benzyl group, or a 4-cyanophenyl group.

12. The method of claim 1, wherein $R^1$, $R^2$, or both comprise one or more of an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a methyl group, a propyl group, a dimethylamino group, or a boronic acid group.

13. The method of claim 1, wherein $R^1$, $R^2$, or both comprise one or more of an (1-(5-(1-(5-Formyl-2-furfyl)-1-methylethyl)-2-furfyl)-1-methylethyl), diphenylsulfone, diphenyl sulfone, diphenyl ether, 1,3-bis(phenoxy)-benzene, moiety, 4,4'-(1,3-phenylenedioxy)dianiline, 1,3-bis(3-aminophenoxy)benzene, 4,4'-oxydianiline, 4-aminophenyl sulfone, 3-aminophenyl sulfone, or isophthalaldehyde derivatives.

14. The method of claim 1, wherein the carbon matrix composite precursor comprises 32 to 42 percent by weight of the carbon-based reinforcement material and 58 to 68 percent by weight of the cured thermoset polymer matrix comprising the chemical composition in accordance with Formula I.

15. The method of claim 1, wherein the method further comprises at least one densification process, the densification process comprising:
  infiltrating the carbon matrix composite with a polymer resin;
  curing the polymer resin introduced in the infiltrating step; and
  heating the carbon matrix composite with cured polymer resin infiltrated therein to the first processing temperature in an atmosphere comprising air, and subsequently in an inert gas environment to the second processing temperature and holding at the second processing temperature for at least 1 hour in the inert gas environment.

16. The method of claim 15, wherein the polymer resin comprises the chemical composition in accordance with Formula I, a phenolic resin based polymer, a furan resin based polymer, or combinations thereof.

17. The method of claim 1, wherein the heating the carbon matrix composite precursor to the first processing temperature is completed at a rate of 0.5° C. to 10° C. per minute.

18. The method of claim 1, wherein the heating the carbon matrix composite intermediate to the second processing temperature is completed at a rate of 0.5° C. to 10° C. per minute.

19. The method of claim 4, wherein the cooling the carbon matrix composite intermediate to room temperature under the atmosphere comprising air is completed at a rate of 0.5° C. to 20° C. per minute.

20. The method of claim 1, wherein the inert gas environment consists of a nitrogen atmosphere.

* * * * *